United States Patent Office 2,773,809
Patented Dec. 11, 1956

2,773,809

CATALYTIC CONVERSION OF NAPHTHA FRACTIONS

Vladimir Haensel, Hinsdale, and Clarence G. Gerhold, Riverside, Ill., assignors to Universal Oil Products Company, Chicago, Ill., a corporation of Delaware No Drawing. Application November 16, 1953, Serial No. 392,489

9 Claims. (Cl. 196—50)

This application is a continuation-in-part of our co-pending application Serial No. 78,586, filed February 26, 1949, now Patent No. 2,659,692 and relates to the catalytic conversion of hydrocarbon fractions containing naphthenes. It is more specifically concerned with the reforming of gasolines and naphthas in the presence of hydrogen and a platinum-containing catalyst by a process wherein the charging stock is separated into at least two fractions and each fraction is processed under particular conditions of operation especially suitable for that material.

Recently, a superior reforming catalyst has been developed, which contains platinum and alumina as the principal constituents and frequently contains minor amounts of a halogen, particularly fluorine or chlorine. This catalyst is capable of increasing the octane number of hydrocarbon stocks such as straight-run gasolines and naphthas to values that are substantially higher than those that ordinarily can be reached by thermal reforming. In addition, the yield-octane number relationship is much better than are the corresponding relationships obtained in either thermal reforming or in most of the prior catalytic reforming processes. It has been found that by an appropriate selection of operating conditions and by charging a feed stock of low end point, this catalyst can be used for a number of weeks without regeneration. However, if the end point of the charge is greater than, for example, about 350° F. or if the charging stock contains minor traces of impurities, which have not as yet been definitely identified but which are known to cause catalyst deactivation by increasing the rate of carbonaceous deposition, the rate of catalyst deactivation is greatly accelerated and regeneration is required in a comparatively short time. The activity of the catalyst is soon lowered to a point at which the catalyst must either be discarded and replaced with fresh catalyst, or the activity of the catalyst must be restored by the removal of the carbonaceous deposit (hereinafter called carbon) by combustion. Both methods are expensive, and it can readily be seen that substantial economic and operating advantages would accrue if it were possible to hinder or retard carbon formation. It has now been found that the rate of carbon formation can be greatly reduced if the charging stock is divided into two or more fractions of different boiling ranges and each of said fractions is processed under particular conditions of intensity approaching the optimum for each fraction. The present invention provides a process by means of which greatly increased catalyst life is obtained with poor stocks as well as with good stocks. In addition, a superior yield-octane number relationship often is obtained.

The process according to the present invention comprises fractionating a hydrocarbon fraction containing naphthenes into a high boiling fraction and a lower boiling fraction, reforming the lower boiling fraction in the presence of added hydrogen and a catalyst comprising platinum and alumina, reforming the high boiling fraction separately from said lower boiling fraction and in the presence of added hydrogen and a catalyst comprising platinum and alumina at a higher hydrogen partial pressure than that applied in the reforming of the lower boiling fraction, and subjecting the lower boiling fraction to an intensity of reforming conditions which is at least ten times as great as the intensity of the reforming conditions to which the high boiling fraction is subjected. This intensity factor of the process may be calculated by the following equation:

$$R.\ I. = \left(\frac{P_{GL}}{P_{GH}}\right)^2 \cdot \left(\frac{P_{H_2H}}{P_{H_2L}}\right)^5 \cdot 2^{\left(\frac{T_L - T_H}{22}\right)}$$

where:

R. I. = relative intensity.
$P_{GL}$ = partial pressure of lower boiling fraction in zone in which said fraction is reformed p. s. i. a.
$P_{GH}$ = partial pressure of high boiling fraction in zone in which said fraction is reformed p. s. i. a.
$P_{H_2H}$ = hydrogen partial pressure in zone in which the high boiling fraction is reformed, p. s. i. a.
$P_{H_2L}$ = hydrogen partial pressure in zone in which the lower boiling fraction is reformed, p. s. i. a.
$T_L$ = effective average temperature in zone in which the lower boiling fraction is reformed, °F.
$T_H$ = effective average temperature in zone in which the high boiling fraction is reformed, °F.

In hydrocarbon reforming processes employing a catalyst comprising platinum and alumina, and usually containing a minor amount of fluorine and/or chlorine, the octane number increase that is obtained appears to be the result of a number of reactions including aromatization, hydrocracking, and isomerization. When a full boiling range straight-run gasoline or a relatively wide boiling range naphtha is employed as the charging stock, the higher boiling portion of the charge is upgraded largely through hydrocracking and aromatization, whereas the lower boiling fractions are upgraded efficiently primarily by isomerization and aromatization reactions. In addition, it has been observed that the higher boiling fractions produce a considerably larger amount of carbon than do the lower boiling fractions of the feed at the same reforming conditions. This apparently is due to the fact that the rate of carbon formation is a function of the boiling range of the feed stock and to the fact that the relatively intense operating conditions that are necessary to satisfactorily upgrade the lower boiling portion of the feed are too drastic for the higher boiling portion. Thus, under the conventional conditions of operation, the operating conditions and the catalyst life are limited by and primarily dependent upon the carbon-forming tendency of the higher boiling fractions. We have found that the higher boiling fractions may be satisfactorily reformed at less intense conditions of operation. Under these conditions the carbon-forming tendency is greatly reduced. On the other hand, we have found that fairly intense operating conditions are necessary in order to satisfactorily reform the lower boiling fractions. However, even under these relatively intense conditions of operation, the amount of catalyst carbon formed from the lower boiling fraction is relatively small.

Under these circumstances, we have found that we obtain markedly increased overall catalyst life, as well as a superior yield-octane number relationship by separating the hydrocarbon charge into, for example, a high boiling fraction and a lower boiling fraction, subjecting each fraction separately from the other to reforming in the presence of added hydrogen and a catalyst comprising platinum and alumina, and subjecting the high boiling fraction to the reforming at a relatively high hydrogen partial pressure and conditions of mild intensity favoring aromatization and hydrocracking, while processing the lower boiling fraction at a lower hydrogen partial pressure and under more intense conditions which favor aromatization and isomerization, although some hydrocracking also will take place.

The hydrocarbon stocks that may be converted in accordance with our process comprise hydrocarbon fractions containing naphthenes. The preferred stocks are those containing naphthenes and paraffins, although minor amounts of aromatics also may be present. This preferred class includes straight-run gasolines, natural gasolines, and the like. In some cases, the charge may comprise olefinic gasolines including, for example, thermally cracked gasoline, coker distillate, catalytically cracked gasoline, etc., or mixtures thereof, and more particularly mixtures of one or more of these stocks with saturated stocks including, for example, straight-run and/or natural gasolines. The gasoline may be a full boiling range gasoline having an initial boiling point within the range of from about 50° to about 100° F. and an end boiling point within the range of from about 325° to about 425° F. and preferably boiling entirely within the range of from 75° to 425° F., or it may be a selected fraction thereof which usually will be a high boiling fraction commonly referred to as naphtha, and generally having an initial boiling point of from about 125° to about 250° F. and an end boiling point within the range of about 350° to about 425° F.

The catalysts comprising platinum and alumina that are preferred for use in the present process may contain substantial amounts of platinum but, for economic as well as for product yield and quality reasons, the platinum content usually will be within the range of from about 0.05 to about 5.0 weight percent. A particularly effective catalyst of this type contains a halogen, especially chlorine or fluorine, in relatively minor amounts, generally within the range of from about 0.1% to about 8% and in most cases not more than about 3% by weight of the alumina (which corresponds, for example, to 158 gram equivalents of fluorine/100,000 grams of alumina) on a dry alumina basis. One method of preparing the catalyst comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying, can be converted to alumina. The halogen may be added to the resultant slurry in the form of an acid such as hydrogen fluoride or hydrogen chloride, or as a volatile salt such as ammonium fluoride or ammonium chloride. A colloidal suspension of platinic sulfide is then prepared by introducing hydrogen sulfide into an aqueous solution of chloroplatinic acid until said solution reaches a constant color, which usually is a dark brown. The resultant colloidal suspension of platinic sulfide is commingled with the aluminum hydroxide slurry at room temperature followed by stirring to obtain intimate mixing. The resulting materials are then dried at a temperature of from about 200° to about 400° F. for a period of from about 4 to about 24 hours or more to form a cake. The dried material will then be converted into pills or other shaped particles. Thereafter the catalyst may be subjected to a calcination or reduction treatment at a high temperature, of the order of 800°–1200° F., prior to use.

The use of the term "catalyst comprising platinum and alumina" in the specification and appended claims is intended to include composites which contain platinum and alumina in any event and which, moreover, may contain other components such as, for example, silica and/or minor amounts of halogen. The exact manner in which the halogen or halide ion is present in the catalyst is not known although it is believed to be present in the form of a chemical combination or loose complex with the alumina and/or platinum components. Because the exact chemical constitution of such halogen-containing catalysts is not known, we sometimes refer to them as "catalysts comprising platinum, alumina, and a halogen." It is known, however, that the presence of a small amount of halogen in the catalyst enhances the hydrocracking activity thereof; for platinum-alumina composites that are substantially halogen-free possess very little ability to promote hydrocracking. In addition, the presence of halogen promotes isomerization reactions, and, indirectly, aromatization reactions.

While the preferred catalyst comprises platinum, alumina and a halogen, it is understood that other reforming catalysts may be employed but not necessarily with equivalent results. However, improved benefits will be obtained when utilizing the other reforming catalysts in the manner herein set forth. The other catalysts may comprise alumina-platinum, silica-alumina-platinum, silica-zirconia-platinum, silica-alumina-zirconia-platinum, silica-magnesia - platinum, silica-alumina - magnesia - platinum, silica-thoria-platinum, silica-alumina-thoria-platinum, alumina-boria-platinum, silica-platinum, etc., which catalysts also may contain halogen.

We have found that the optimum reforming of given charge is not attained by subjecting the lower boiling fractions to a more drastic conversion which would result from increasing one or more of the extensive factors found optimum for reforming the higher boiling fractions of the same stock. For obtaining the optimum reforming we have found it necessary to operate in a manner such that the lower boiling fractions are subjected to more intense reforming conditions and at a lower hydrogen partial pressure than are the higher boiling fractions. The principal variables that determine the intensity of the reforming operations are hydrocarbon reactant partial pressure, hydrogen partial pressure and temperature. It is not necessary that the intensity of each variable, other than the hydrogen partial pressure, be greater in the operation with the light fraction, but merely that the resultant of all the variables be more intense. To illustrate this point, the temperature at which the light fraction is reformed may be 880° F. and the temperature at which the heavy fraction is reformed may be 900° F. However, if the other variables are sufficiently more intense in the operation with the light fraction so that the resultant overall intensity of reforming is greater with the light fraction than it is with the heavy fraction, the requirements of our process have been met.

The hydrocarbon reactant partial pressure ordinarily should lie within the range of from about 20 to about 400 p. s. i. a. The reason for the lower limit is found in the fact that in the presence of hydrogen the catalyst employed in our process promotes hydrocracking and isomerization of said stocks as well as aromatization. However, in order to obtain hydrocracking there must be a rather appreciable partial pressure of hydrogen in the reaction zone. If the hydrocarbon partial pressure is much below about 20 pounds, the hydrogen/hydrocarbon ratio must be excessive in order that the hydrogen partial pressure will be sufficiently high to effectively bring about hydrocracking. On the other hand, if the hydrocarbon partial pressure is greater than about 400 pounds, the total pressure becomes excessive even at fairly low hydrogen/hydrocarbon ratios of the order of 4:1. We have found that if the hydrocarbon reactant partial pressure is increased, all other conditions remaining the same, the intensity of the reforming operation increases and the formation of carbon on the catalyst increases.

The hydrogen partial pressure ordinarily should be within the range of from about 200 to about 120 p. s. i. a. and preferably from about 300 to about 1000 p. s. i. a. for the high boiling fractions. It sould ordinarily be within the range of from about 125 to about 1000 and preferably from about 150 to about 650 p. s. i. a. for the lower boiling fractions. At hydrogen partial pressures below the indicated lower limits there is little or no hydrocracking and there is excessive production of catalyst carbon. On the other hand, at hydrogen partial pressures in excess of the upper limits, the proportion of hydrocracking increases, aromatization decreases, and hydrogen consumption is encountered. Within the approximate limits indicated, the intensity of the reforming operation decreases as the hydrogen partial pressure is increased. The difference between the hydrogen partial pressures applied in reforming of the high boiling or heavy fractions and the lower boiling or lighter fractions, respectively, preferably is from about 100 to about 400 p. s. i. a and in general will be the larger, the higher the hydrogen partial pressure for the high boiling fractions.

The reforming temperatures employed in our process generally lie within the range of about 750° to about 1000° F. At temperatures much below about 750° F. the hydrocarbon conversion reactions are quite slow and very low space velocities must be employed to obtain appreciable conversions. In addition, an unfavorable naphthene-aromatic equilibrium is encountered. At reaction temperatures above about 1000° F., an appreciable amount of thermal reaction takes place accompanied by poorer liquid recovery and more rapid catalyst deactivation. In the correlation according to the formula of relative intensity that is more fully explained hereinafter, effective average catalyst temperatures are used, said temperatures being obtained by dividing the reactor into convenient segments, each of which may be considered as being approximately at a constant temperature. The relative reaction rate coefficient for each segment at its average temperature is obtained and this coefficient is multiplied by the fractional part of the bed corresponding to the segment. The resultant products are added up for the entire bed, and the sum is the effective average rate coefficient for the bed. The temperature corresponding to this reaction rate coefficient is then the effective average temperature. However, since the correlation is designed to give only the intensity of the operating conditions with the light fraction relative to the intensity of the operating conditions with the heavy fraction, i. e., a relative intensity, we have found that the arithmetic average temperature may be employed with satisfactory results. The arithmetic average temperature is obtained by taking a fairly large number of temperature points through the bed and simply averaging them. This method avoids the rather involved method of obtaining the effective average temperature. The intensity of reforming increases with increasing temperature.

The preferred weight hourly spaced velocities used in our process (weight hourly space velocity being defined as the weight of hydrocarbon charge per hour per unit weight of catalyst in the reaction zone) usually will lie within the range of from about 0.2 to about 40. In contrast to hydrocarbon reactant partial pressure, hydrogen partial pressure and temperature, which are intensive factors, space velocity is an extensive factor in our process. In a given operation, the intensive variables ordinarily will be selected in accordance with the teachings herein set forth. The space velocity may then be adjusted to obtain the desired reforming severity. The severity of reforming increases as the space velocity is decreased.

In carrying out the process of this invention the lower boiling fraction may be reformed in one reaction zone at the same time that the high boiling fraction is being reformed in another reaction zone. This mode of processing has the advantage of permitting continuous reforming treatment of both fractions. In another mode of carrying out the present process, the reforming of the two fractions may be effected during alternating periods of operation in a single reaction zone. In either mode of operation, the gasoline charge may be fractionated in any suitable manner and with the aid of conventional fractionating devices. When effecting the reforming of the fractions in alternating periods of operation, one of the two fractions is accumulated in intermediate storage, while the other fraction is subjected to the reforming treatment. The reforming treatment of each fraction is preferably carried out by commingling the hydrocarbon fraction with the appropriate amount of hydrogen or gas of high hydrogen content, such as recycle hydrogen gas separated from the products of the process, passing the mixture of hydrogen and hydrocarbon fraction through a tubular heater wherein the mixture is heated to reaction temperature, passing the heated effluent from the heater into and through a heat-insulated reaction chamber and the catalyst contained therein, preferably in a generally downward direction through a stationary bed of catalyst particles in such chamber, withdrawing the effluent from the reaction chamber through a line containing a pressure control valve and through a condenser into a receiver wherein recycle hydrogen gas is separated from the cooled and liquefied reaction products under an appropriate pressure, and thereafter recovering the reformed gasoline in a conventional manner. A stream of the hydrogen gas separated in the receiver is recirculated to the inlet side of the tubular heater to commingle with the stream of gasoline fraction entering the same. In the mode of operation wherein both the high boiling fraction and the low boiling fraction are subjected simultaneously to reforming treatment in separate reaction zones it is preferred to commingle the effluents of the two separate catalytic treatments and then subject the commingled streams to condensation, cooling, hydrogen gas separation and product recovery. Excess hydrogen gas produced in the process is usually removed from the system in the stage thereof wherein the reformed gasoline is recovered. It is understood that a series of two or more reaction chambers, preferably with intervening heating between chambers, may be employed for the separate processing of the light and/or heavy fractions.

The following examples are introduced to illustrate further the novelty and utility of the present invention but not with the intention of unduly limiting the same.

*Example I*

It is desired to continuously reform a straight-run gasoline having a boiling range from 100 to 400° F. Accordingly, the gasoline is continuously separated by fractional distillation into a light fraction boiling from 100° to 200° F. and a heavy fraction boiling from 200° to 400° F. The two fractions are alternately subjected to reforming in the presence of added hydrogen and platinum-alumina-halogen catalyst containing 0.3% by weight of platinum and about 0.3% by weight of fluorine, under the following conditions of reaction, the hydrogen being continuously separated from the reforming products and recycled to the reaction zone:

| Fraction | Light | Heavy |
| --- | --- | --- |
| Hydrocarbon boiling range, °F | 100–200 | 200–400 |
| Temperature of reaction zone, °F | 930 | 920 |
| Total pressure in reaction zone, p. s. i. a | 300 | 500 |
| Mol ratio, hydrogen to hydrocarbon | 4:1 | 4.5:1 |
| Volume percent hydrocarbon gas in hydrogen stream | 12 | 13.5 |
| Space velocity, weight of hydrocarbon charged per hour per weight of catalyst | 2 | 2 |

After operation under these conditions for a period of two weeks, a decline in the activity of the catalyst becomes noticeable, and at the end of three weeks necessitates stopping the operation. Examination of this catalyst discloses excessive carbonization.

A calculation of the relative intensity of the treatment of the low and high boiling fractions follows:

Low-boiling fraction:
Mols total recycle gas per mol low boiling fraction $$\frac{4}{.88}=4.55$$

Partial pressure of H₂ in reaction zone ($P_{H_2L}$) =

$$300\left(\frac{4}{5.55}\right)=216 \text{ p. s. i. a.}$$

Partial pressure of low boiling fraction in reaction zone ($P_{GL}$) =

$$300\left(\frac{1}{5.55}\right)=54 \text{ p. s. i. a.}$$

$$T_L=930° \text{ F.}$$

High-boiling fraction:
Mols total recycle gas per mol high boiling fraction $$\frac{4.5}{.865}=5.2$$

Partial pressure H₂ in reaction zone ($P_{H_2H}$) =

$$500\left(\frac{4.5}{6.2}\right)=365 \text{ p. s. i. a.}$$

Partial pressure high boiling fraction in reaction zone ($P_{GH}$) =

$$500\left(\frac{1}{6.2}\right)=80.7 \text{ p. s. i. a.}$$

$$T_H=920° \text{ F.}$$

$$R.\ I.=\left(\frac{54}{80.7}\right)^2 \cdot \left(\frac{365}{216}\right)^5 \cdot 2^{\left(\frac{930-920}{22}\right)}=8.5$$

This calculation confirms that the relative intensities of the reforming treatments of the two fractions were not in accordance with the invention. The operation is then resumed with a fresh catalyst and at the same temperatures and total pressures. However, the mol ratio of hydrogen to high boiling hydrocarbon is now raised to 6:1 (the volume percent of hydrocarbon gas in the recycle stream being 13%). Satisfactory operation over a period of several months results.

Recalculation of the value of $P_{H_2H}$ gives 380 p. s. i. a. and of the value for $P_{GH}$ gives 63 p. s. i. a. When these values are substituted in the formula for "R. I.," it is found that the relative intensity of the two treatments is now 17.1, or in other words, the reforming conditions to which the low boiling fraction is subjected are more than 17 times as intense as those applied to the high boiling fraction.

A similarly improved operation results if, instead of increasing the hydrogen partial pressure in the reforming zone for the high boiling fraction by increasing the mol ratio of hydrogen to high boiling hydrocarbon, as indicated, the effective average temperature of the reaction of the high boiling fraction is decreased. For example, by decreasing $T_H$ from 920° to 910° F., the relative intensity is increased to about 12.

From the foregoing, it can be seen that the invention permits to achieve longer catalyst life. Also a better yield-octane number relationship is obtained by the reforming of gasoline hydrocarbon stocks in accordance with the invention as described above, the reason for this better relationship being two-fold, namely the diminution of carbonization reactions and the favorable effect of the relative intensity in the reforming on the octane numbers of the resultant reformed gasoline fractions.

We claim as our invention:

1. A process which comprises separating a hydrocarbon reforming charge stock into a higher boiling fraction and a lower boiling fraction, reforming the lower boiling fraction in the presence of added hydrogen and a platinum-containing catalyst, separately reforming the higher boiling fraction in the presence of a platinum-containing catalyst of substantially the same composition as said first mentioned catalyst, but at a higher hydrogen partial pressure than utilized in the reforming of the lower boiling fraction, and subjecting the lower boiling fraction to an intensity of reforming conditions which is at least 10 times as great as the intensity of the reforming conditions to which the higher boiling fraction is subjected.

2. A reforming process which comprises fractionating a hydrocarbon reforming charge stock containing naphthenes and boiling below about 425° F. into a higher and a lower boiling fraction, reforming the lower boiling fraction in the presence of added hydrogen and a catalyst comprising platinum and alumina, separately reforming the higher boiling fraction in the presence of added hydrogen and a catalyst comprising platinum and alumina of substantially the same composition as said first mentioned catalyst, but at a higher hydrogen partial pressure than utilized in the reforming of the lower boiling fraction, and subjecting the lower boiling fraction to an intensity of reforming conditions which is at least 10 times as great as the intensity of the reforming conditions to which the higher boiling fraction is subjected.

3. The process of claim 2 further characterized in that said catalyst comprises alumina, and platinum in a concentration of from about 0.05 to about 5% by weight.

4. The process of claim 2 further characterized in that said catalyst comprises alumina, platinum in a concentration of from about 0.05 to about 5% by weight, and halogen in a concentration of from about 0.1% to about 8% by weight.

5. The process of claim 4 further characterized in that said halogen comprises fluorine.

6. The process of claim 4 further characterized in that said halogen comprises chlorine.

7. The process of claim 2 further characterized in that the higher boiling fraction is reformed at a hydrogen partial pressure of at least 100 pounds higher than the hydrogen partial pressure applied in the reforming of the lower boiling fraction.

8. A process for the conversion of a hydrocarbon reforming charge stock containing naphthenes boiling in the gasoline range, which comprises separating said stock into a light fraction and a heavier fraction, and separately reforming said fractions in the presence of hydrogen and platinum-containing catalyst, the light fraction being subjected to an intensity of reforming conditions at least 10 times greater than the heavier fraction and the latter being reformed at a hydrogen partial pressure at least 100 pounds per square inch higher than that at which said light fraction is reformed.

9. A process for the conversion of a hydrocarbon reforming charge stock containing naphthenes boiling in the gasoline range, which comprises separating said stock into a light fraction and a heavier fraction, reforming said light fraction in a first zone in the presence of hydrogen and a body of catalyst comprising platinum and alumina, and separately reforming said heavier fraction in a second zone at less intense conditions in the presence of another body of catalyst comprising platinum and alumina and at a hydrogen partial pressure at least 100 pounds per square inch higher than that at which said light fraction is reformed, the intensity of the reforming conditions in said first zone being at least 10 times as great as that in said second zone.

References Cited in the file of this patent

UNITED STATES PATENTS

| | | |
|---|---|---|
| 2,348,599 | Brown | May 9, 1944 |
| 2,479,110 | Haensel | Aug. 16, 1949 |
| 2,485,073 | Shiffler et al. | Oct. 18, 1949 |
| 2,504,415 | Hepp | Apr. 18, 1950 |